US010545925B2

(12) United States Patent
Trika et al.

(10) Patent No.: US 10,545,925 B2
(45) Date of Patent: Jan. 28, 2020

(54) STORAGE APPLIANCE FOR PROCESSING OF FUNCTIONS AS A SERVICE (FAAS)

(71) Applicant: Intel Corporation, Santa Clara, CA (US)

(72) Inventors: Sanjeev N. Trika, Portland, OR (US); Jawad B. Khan, Portland, OR (US); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 16/001,398

(22) Filed: Jun. 6, 2018

(65) Prior Publication Data

US 2019/0042594 A1 Feb. 7, 2019

(51) Int. Cl.
*G06F 16/182* (2019.01)
*H04L 29/08* (2006.01)
*H04L 29/06* (2006.01)

(52) U.S. Cl.
CPC ........ *G06F 16/1834* (2019.01); *H04L 67/104* (2013.01); *H04L 67/34* (2013.01); *H04L 67/42* (2013.01)

(58) Field of Classification Search
CPC ..... G06F 16/1834; H04L 67/34; H04L 67/42; H04L 67/104
See application file for complete search history.

(56) References Cited

U.S. PATENT DOCUMENTS

| 9,038,189 | B1* | 5/2015 | Stevens | G06F 21/60 726/26 |
| 2002/0020175 | A1* | 2/2002 | Street | F25B 49/02 62/132 |
| 2004/0016244 | A1* | 1/2004 | Street | F25B 49/02 62/132 |
| 2004/0024495 | A1* | 2/2004 | Sunderland | F25B 49/02 700/299 |
| 2014/0143121 | A1* | 5/2014 | Stevens | G06Q 40/04 705/37 |
| 2018/0337904 | A1* | 11/2018 | Letourneau | H04L 63/065 |

OTHER PUBLICATIONS

"Amazon EC2 F1 Instances," Dec. 4, 2018, AWS, 14 pgs.
"Intel Eases Use of FPGA Acceleration: Combines Platforms, Software Stack and Ecosystem Solutions to Maximize Performance and Lower Data Center Costs," https://newsroom.intel.com/contact-intels-public-relations-team/, Dec. 4, 2018, 5 pages.
John C Sakamoto, "Supercharging Data Center Performance While Lowering TCO: Versatile Application Acceleration with FPGAS," IT Peer Network, Oct. 2, 2017, 7 pages.
Wikipedia, "Function as a Service," Dec. 4, 2018, 2 pages.

* cited by examiner

*Primary Examiner* — Azizul Choudhury
(74) *Attorney, Agent, or Firm* — Compass IP Law, PC

(57) ABSTRACT

Examples may include a storage appliance having a mass storage device and a compute engine communicating peer-to-peer with each other, with the compute engine including a programmable logic component to execute a function to read data from the at least one storage device, process the data, and write data to the at least one storage device.

12 Claims, 6 Drawing Sheets

STORAGE APPLIANCE FOR PROCESSING OF FUNCTIONS AS A SERVICE (FAAS)

TECHNICAL FIELD

Examples described herein are generally related to accelerating processing of functions in a data center.

BACKGROUND

Function as a Service (FaaS) is a fast-growing usage model for data centers. FaaS is a category of cloud computing services that provides a computing platform to customers to allow customers to develop, run, and manage application functions without the complexity of building and maintaining the infrastructure typically associated with developing and launching an application. Building an application following this model is one way of achieving a "serverless" architecture and is typically used when building microservices applications.

FaaS enables data centers (e.g., such as those run by cloud service providers) to provide to their customers the capability to select specific functions to execute in the data center and to pay for per function processing. Well-defined functions (e.g., sort, search, matrix operations, etc.) are provided by cloud service providers to customers. In addition, customers can provide pre-programmed modules (e.g., as plugins, virtual machines (VMs) or containers) that are run as functions on data center servers. When these custom functions are both compute intensive and data intensive with small data results, as is typical in applications such as analytics, artificial intelligence (AI), and others, processing of custom functions by the data center becomes inefficient. This is because the data is typically read by the custom functions as they are being executed on the data center compute server CPUs, where the data is processed, and the results of the computations are sent back to the customer's system and/or to storage devices within the data center. Processing by compute server CPUs, data transfers over the network, and heavy usage of memory bandwidth all frequently become bottlenecks to various degrees in such use cases, thus slowing down overall application throughput and increasing response times. Additionally, when customers are paying per processing core usage or per function execution, the typical data center architecture becomes too expensive.

In some scenarios, field programmable gate array (FPGAs) are used to execute the functions. However, the FPGAs are resident in the compute servers. The compute servers control the data flow to and from the FPGAs vis-à-vis mass storage devices in the data center, execute additional processing, and transfer results of the FPGA computations back to the requesting system component. This still results in heavy network and memory bandwidth usage, negatively affecting application performance.

DETAILED DESCRIPTION

As contemplated in the present disclosure, embodiments of the present invention comprise a data center architecture that allows FaaS customers to specify storage-centric compute offloads for functions. As used herein, a function is a sequence of instructions that perform a specific task, packaged as a unit. This unit can then be used wherever that particular task should be performed. Compute offloads are structured as a combination of zero or more cloud service provider functions or zero or more customer provided functions and are executed by a storage appliance instead of a compute server. Further, data center customers can package and execute functions in such a way that the functions can be chained together. Embodiments enable compute offloads to any compute engine in the data center for cost and power reduction (not just those resident within compute servers), while providing flexible software and hardware accelerators desired by cloud service customers. In embodiments, the compute engines are included close to mass storage devices in the data center for efficient data transfers and computations, such as within a storage appliance. The present architecture results in significant reduction in data traffic between storage devices and compute servers, thereby improving system performance for cloud applications.

Figure 1:
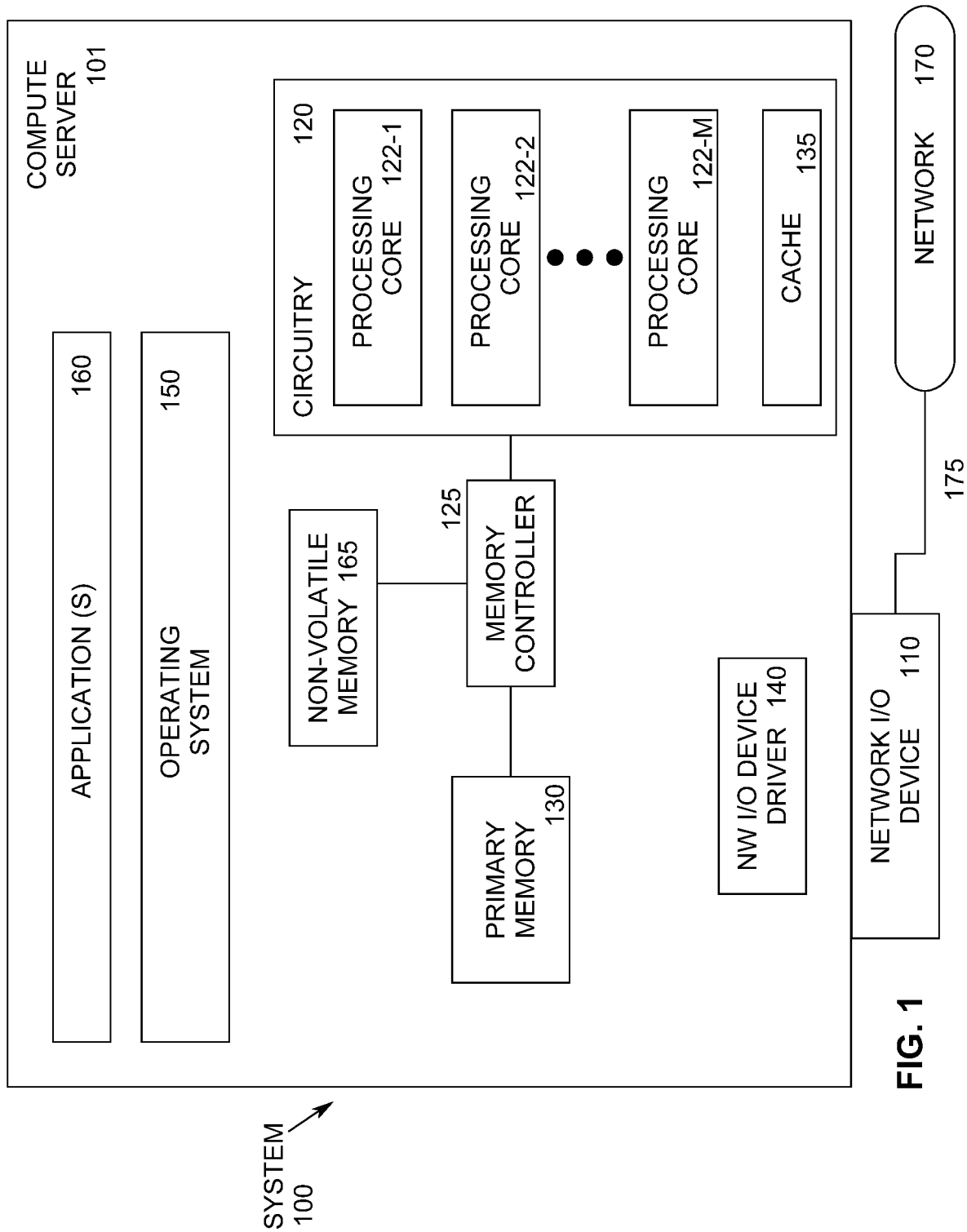
FIG. 1 illustrates an example compute server.

FIG. 1 illustrates an example computing system 100 which may in some embodiments be in a data center. As shown in FIG. 1, computing system 100 includes a compute server 101 coupled to a network 170. In some examples, as shown in FIG. 1, compute server 101 is coupled to network 170 via a network communication channel 175 and through a network I/O device 110 (e.g., a network interface controller (NIC)) having one or more ports connected or coupled to network communication channel 175.

According to some examples, compute server 101, as shown in FIG. 1, includes circuitry 120, primary memory 130 (which may be volatile), non-volatile memory (NVM) 165, memory controller 125, a network (NW) I/O device driver 140, an operating system (OS) 150, one or more application(s) 160. In an example, at least a portion of application(s) 160 is provided by a customer of the data center. In some examples, as shown in FIG. 1, circuitry 120 is communicatively coupled to primary memory 130 and NVM 165 via memory controller 125. In other examples, memory controller 125 may be integral with processor circuitry 120. Although not shown in FIG. 1, in some examples, operating system 150, NW I/O device driver 140 or application(s) 160 is implemented, at least in part, via cooperation between one or more memory devices included in primary memory 130 (e.g., volatile or NVM devices), NVM 165 and elements of circuitry 120 such as processing cores 122-1 to 122-$m$, where "m" is any positive whole integer greater than 2.

In some examples, compute server 101, includes, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or a combination thereof. Also, circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors; and similar processors. Circuitry 120 may include at least one cache 135 to store data.

According to some examples, primary memory 130 and/or NVM 165 is composed of one or more memory devices or dies which may include various types of volatile and/or non-volatile memory. Volatile types of memory include, but are not limited to, dynamic random-access memory (DRAM), static random-access memory (SRAM), thyristor RAM (TRAM) or zero-capacitor RAM (ZRAM). Non-volatile types of memory include byte or block addressable types of non-volatile memory having a 3-dimensional (3-D) cross-point memory structure that includes chalcogenide phase change material (e.g., chalcogenide glass) hereinafter referred to as "3-D cross-point memory" (such as 3D XPoint™ commercially available from Intel Corporation). Non-volatile types of memory also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In one example, primary memory 130 is a volatile memory and persistent memory 165 is an NVM.

Figure 2:
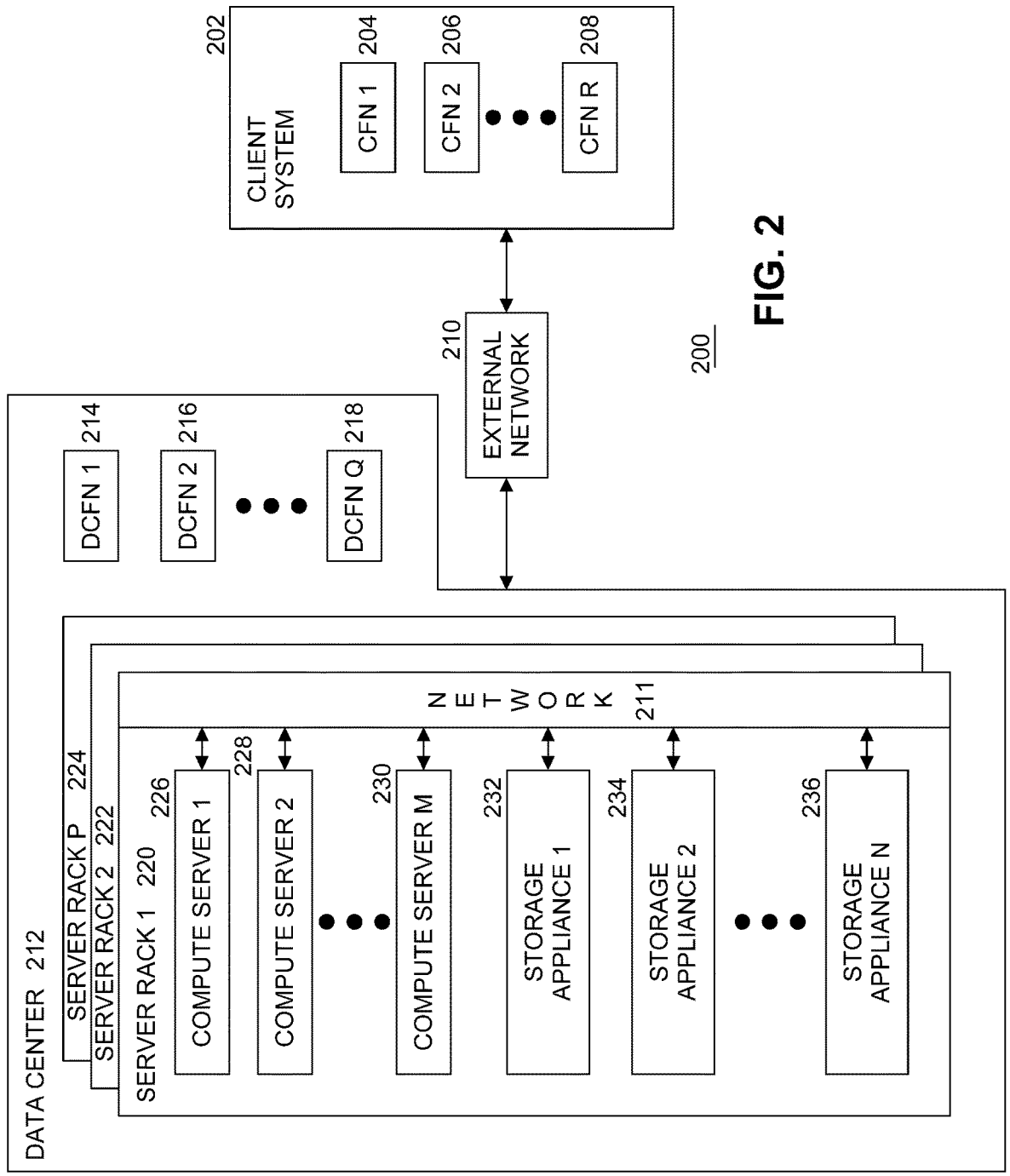
FIG. 2 illustrates an example of a first data center architecture.

FIG. 2 illustrates an example of a first data center architecture. At least one client system 202 communicates with a data center 212 over an external network 201 (such as the Internet, for example) using known communication protocols. A client system may be any type of computing device for executing one or more applications. In an embodiment, there may be any number of client systems in use. Data center 212 comprises a server farm (also known as a server cluster). In data center 212, there are one or more server racks such as server rack 1 220, server rack 2 228, . . . server rack P 224, where P is a natural number. Each server rack, such as server rack 1 220, comprises one or more compute servers, such as compute server 1 226, compute server 2 228, . . . computer server M 230, where M is a natural number. In practice, there may be thousands of server racks in a data center, with many thousands of compute servers supporting the data processing needs of perhaps millions of client systems.

In an embodiment, each compute server of FIG. 2 is configured the same as or similar to compute server 101 of FIG. 1. As discussed with reference to FIG. 1, compute servers are used to execute applications 160. In an embodiment, these applications are provided by client system 202. In another embodiment, these applications are provided by the operator of the data center. In an embodiment, at least some data is provided by the client system for processing by the application in the data center. Compute servers communicate with each other over network 211. In an embodiment, there is a network for each server rack. In an embodiment, network 211 provides the capability for compute servers on different racks to communicate with each other. Network 211 is communicatively coupled with external network 210 (such as the Internet, for example), thereby allowing applications being executed on compute servers to communicate with client systems.

In an embodiment, each server rack includes one or more storage appliances, such as storage appliance 1 232, storage appliance 2 234, . . . storage appliance N 236, where N is a natural number. In practice, each server rack may include tens, hundreds, or even thousands of storage appliances. Storage appliances communicate with other storage appliances and compute servers over network 211. Storage appliances also communicate with client systems over external network 210. In embodiments of the present invention, a storage appliance comprises a system to provide both mass storage and computing capabilities. In mass storage devices currently used in data centers, the mass storage devices typically are relatively "dumb" storage devices and do not provide significant compute capabilities. In contrast, in embodiments of the present invention the data center offloads at least some of the compute load of the compute servers in the data center to the storage appliances.

Data center 212 provides FaaS capabilities to data center customers operating client systems. One or more modules called functions, such as data center function (DCFN) 1 214, DCFN 2 216, . . . DCFN Q 218, where Q is a natural number, are available in the data center for use in processing the compute workloads of customers. Each DCFN, when executed on a computer server or a storage appliance, performs a well-defined operation based on zero or more input data and resulting in one or more output data. For example, data center 212 provides functions to sort data, search data, and compute matrix operations. Many other functions are contemplated and embodiments of the present invention are not limited to these examples. Similarly, client system 202 defines customer provided functions, such as customer function CFN 1 204, CFN 2 206, . . . CFN R 208, where R is a natural number. Customer provided functions may, when executed, perform any processing needed as part of an application. In an embodiment, data center 212 charges a fee to a client system based on what functions (whether data center provided or customer provided) are executed by components in the server racks. The fee may be based on one or more of many different possible variables and statistics of the data center, such as the number of times a function was executed, how many processor cycles were used, how much storage was used, how much network bandwidth was used, and so on. A client system selects zero or more data center provided functions and zero or more customer provided functions to be executed as part of an application. In an embodiment, input data for a function is obtained from a client system and/or one or more storage appliances, and output data is written to a client system and/or one or more storage appliances.

When some functions are executed by compute servers, data center 212 may experience negative application performance effects from having to obtain data to process from one or more storage appliances, communicate the data over network 211, process the data in the compute servers (including accessing memories such as primary memory 130 and non-volatile memory 165 by storing data obtained from storage appliances into these memories before, during, and after processing the data), and communicating resulting data back over network 211 to storage appliances. To improve system performance, in embodiments of the present invention data center 212 offloads at least some of the compute workload from compute servers to storage appliances.

Figure 3:
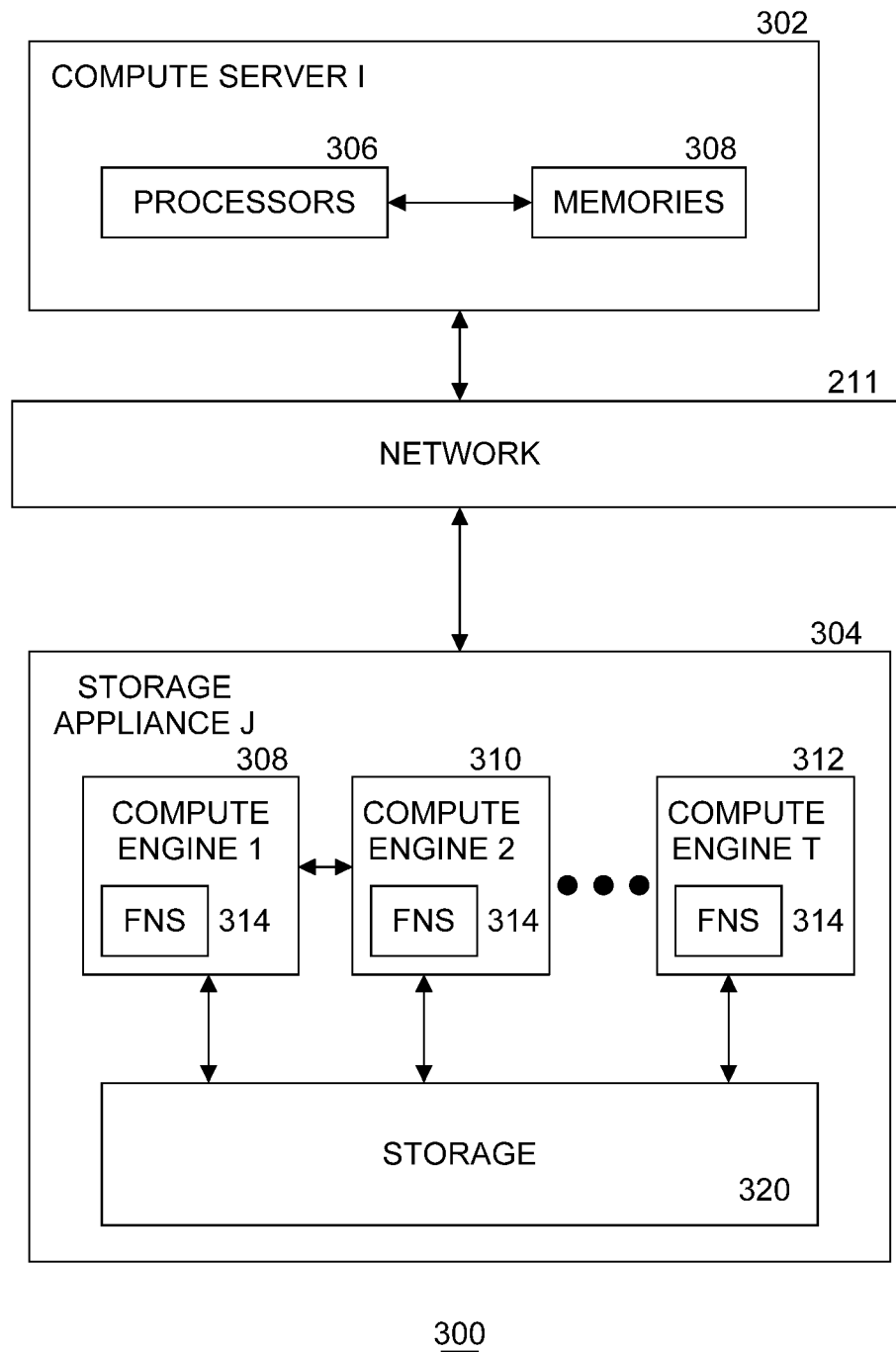
FIG. 3 illustrates an example of a second data center architecture.

FIG. 3 illustrates an example of a second data center architecture. In this architecture, a compute server, such as compute server I 302 communicates with a storage appliance, such as storage appliance J 304, over network 211. Compute server I includes one or more processors 306 (such as circuitry 120 of FIG. 1) coupled to one or more memories 308 (such as primary memory 130 and non-volatile memory 16 of FIG. 1). In this architecture, instead of compute server I executing the compute workload of one or more functions, the compute workload is offloaded to storage appliance J 304. In an embodiment, storage appliance J 304 comprises one or more logic components called compute engines such as compute engine 1 308, compute engine 2 310, . . . compute engine T 312, where T is a natural number, with each compute engine including logic being capable of executing one or more functions (FNS) 314. Functions 314 may be any one or more of DCFNs 214, 216, . . . 218, and/or CFNs 204, 206, . . . 208. Compute engines read data from and write data to storage 320. Because compute engines 308, 310, . . . 312 within storage appliance J 304 are performing processing of the functions 314 instead of processors 306 in the compute server, overall system performance is increased because the need to communicate data over network 211, and into and out of memories 308, is reduced.

Figure 4:
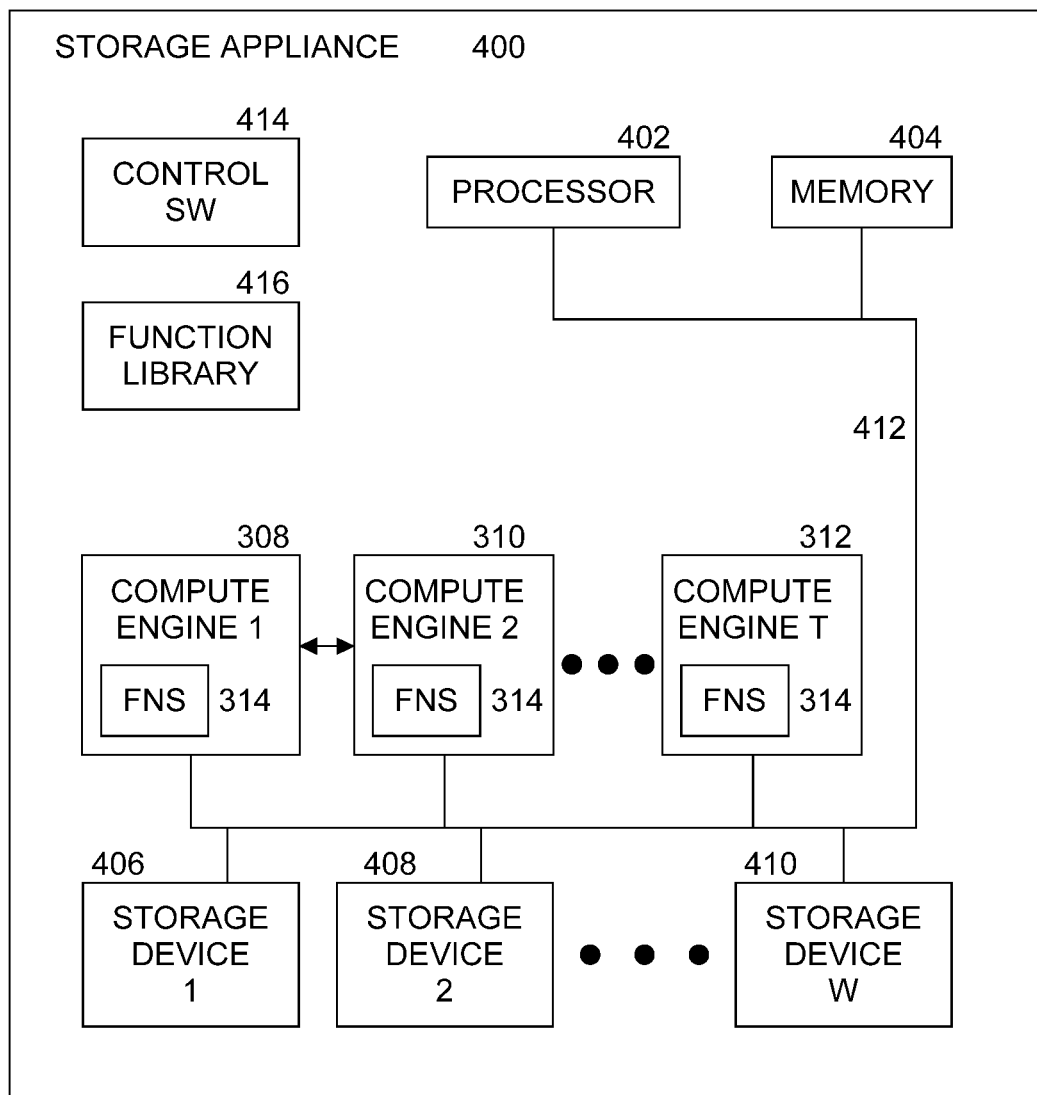
FIG. 4 illustrates an example of a storage appliance.

FIG. 4 illustrates an example of a storage appliance 400. Storage appliance 400 includes storage 320 comprising one or more storage devices, such as storage device 1 406, storage device 2 408, . . . storage device W 410, where W is a natural number. A storage device may be any mass storage device, such as a hard disk drive (HDD), a solid-state drive (SSD). Compute engines 308, 310, . . . 312 execute functions FNS 314 based at least in part on data read from the storage devices and may write resulting data to the storage devices. In an embodiment, compute engines and storage devices are coupled over a bus 412, and any compute engine communicates with any storage device in a peer-to-peer manner over the bus. This alleviates the data transfer load on network 211. In an embodiment, bus 412 may be any version of a Peripheral Component Interconnect Express (PCI-e) bus based on a specification published by the PCI special interest group (SIG), although other buses may also be used. Storage appliance 400 also includes a processor 402 to execute control software (SW) 414 to manage the use of the compute engines. Storage appliance 400 includes a memory 404 to store control SW instructions 414 and data.

In an embodiment, storage appliance 400 includes a function library 416 to store one or more functions (zero or more DCFNs and zero or more CFNs). In an embodiment, function library 416 is stored in one or more of the storage devices and is read by any compute engine for processing. By storing functions in function library 416, the functions are accessible within the storage appliance. Thus, once a function is stored for the first time within the storage appliance, the function need not be retrieved from a compute server, another storage appliance, or a client system (unless and until the function is changed). This locality of the functions within the storage appliance results in better overall system performance.

In various embodiments, a compute engine resident in the storage appliance may be a programmable logic component comprising a FPGA, a group of FPGAs, a central processing unit (CPU), a graphics processing unit (GPU), an application specific integrated circuit (ASIC), or any other programmable logic component. In various embodiments, the plurality of compute engines within a storage appliance comprises any combination of zero or more FPGAs, zero or more CPUs, and zero or more GPUs, with each compute engine including at least one programmable logic component (i.e., a FPGA, CPU, GPU, or ASIC). In an embodiment, a programmable logic component such as a CPU, GPU, ASIC, or FPGA in the storage appliance executes a function to read data from a storage device, process the data, write data to the same or another storage device, consume data obtained from network 211 or 210 or another chained programmable logic component, and share data to network 211 or 210 or to another chained programmable logic component.

Figure 5:
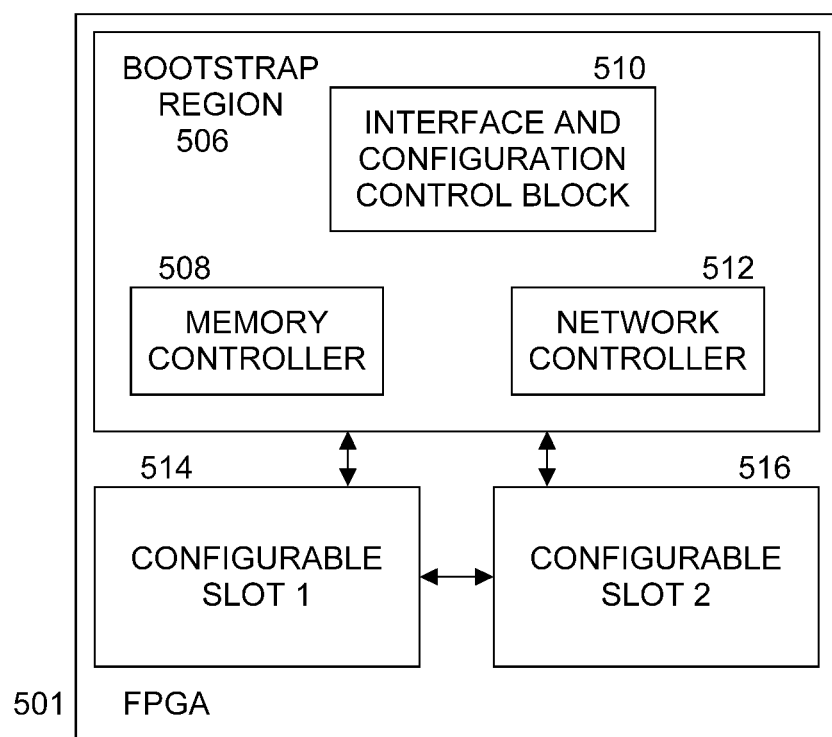
FIG. 5 illustrates an example of a field programmable gate array (FPGA).

FIG. 5 illustrates an example of a field programmable gate array (FPGA) 501 operating as a compute engine resident in the storage appliance. In an embodiment, a compute engine comprises FPGA 501. FPGA 501 includes a bootstrap region 506. Bootstrap region 506 includes an interface and configuration control block 510, memory controller 508, and network controller 512 as is known in the art of FPGAs. In an embodiment, FPGA 501 includes one or more configurable slots. Although two configurable slots, such as configurable slot 1 514 and configurable slot 2 516, are shown in FIG. 5, there may be any number of configurable slots in the FPGA.

In an embodiment, a bootstrap bitstream is used to load the FPGA. The bootstrap bitstream is downloaded from a data center server (such as a compute server) during startup of the storage appliance containing the FPGA. The bootstrap bitstream provides the basic functionality of configuring PCIe blocks, memory controller 508, network controller 512, and other components.

FPGA 501 includes a plurality of configurable slots 514, 516, where different compute offloads can be loaded and executed. A configurable slot comprises a set of Logic Elements (LEs) that can be used by a compute offload. A compute offload as used herein includes one or more functions, either provided by the data center, the customer, or both. The location of LEs for each configurable slot may be fixed in the FPGA and a unique bitstream based on one or more functions can be generated for each configurable slot.

In an embodiment, compute offloads have a defined data-plane interface allowing the FPGA to chain compute offloads into pipelines of compute offloads. These pipelined compute offloads can be added or removed from the pipeline using partial reconfiguration of the FPGA. Although an FPGA is shown in FIG. 5, this chaining concept is not limited to FPGAs only, and can be applied also for other processing components (e.g., CPUs/GPUs/ASICs).

Figure 6:
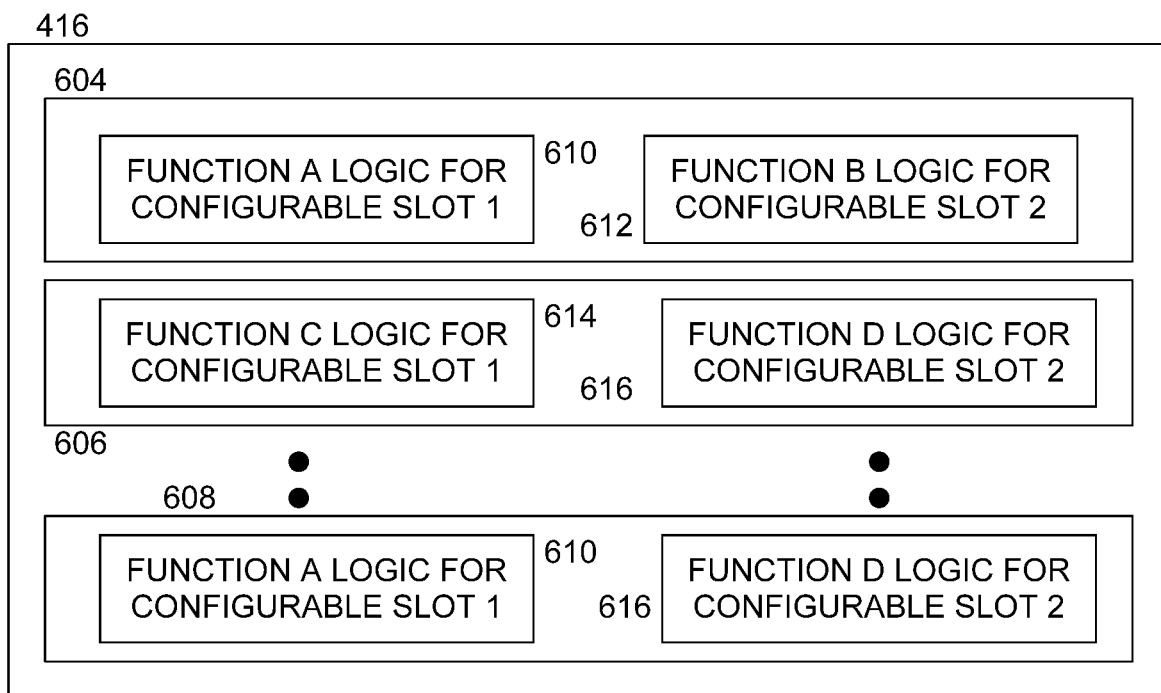
FIG. 6 illustrates an example of a library of functions.

FIG. 6 illustrates an example of a library of functions 416. In an embodiment, library 416 is grouped into one or more compute offload bitstreams such as 604, 606, . . . 608. Each compute offload bitstream includes one or more function logic components for a configurable slot. For example, since two configurable slots 514, 516 are shown in FPGA 501, each compute offload bitstream includes two function logic components, although in other examples more or less slots and corresponding more or less compute offload bitstreams may be used. For example, compute offload bitstream 604 includes function A logic for configurable slot 1 610 and function B logic for configurable slot 2 612, compute offload bitstream 606 includes function C logic for configurable slot 1 614 and function D logic for configurable slot 2 616, and so on. Functions may be used in combinations within a compute offload depending on the function definitions and uses. For example, compute offload bitstream 608 may use function A logic for configurable slot 1 610 and function D logic for configurable slot 2 616.

The example of FIG. 6 shows that there are multiple configurable compute offloads available for the two slots available on the example FPGA of FIG. 5. In an embodiment, the compute offloads are functionally identical in the two bitstreams but target different configurable slots. The compute offloads are coupled in a pipelined fashion, where the data comes from a storage device, is processed by the first compute offload loaded in configurable slot 1 514 to produce output data from the first compute offload and then the output data is passed as input data to configurable slot 2 516 which is hosting another compute offload. The processed data from the second compute offload is sent back to a compute server or is stored in memory 404 or a storage device 406, 408, . . . 410 for further processing using other compute offloads. Once all processing is complete, the final result may be sent to the requesting compute server or stored in a storage device. Pipelining could be spatial or temporal as identified above. A temporal pipeline may be configured on demand only for purposes of a particular processing function. A spatial pipeline is not limited to a single FPGA/CPU/GPU/ASIC; the processing pipeline can consist of processing components distributed across many FPGAs/CPUs/GPUs/ASICs. Generally, a pipeline may have as many components as there are configurable slots.

For example, there may be functions in function library 416 to perform tasks such as decrypting data, decompressing data, encrypting data, compressing data, querying data, averaging data, and so on. Functions can include any processing specified by a data center (e.g., DCFNs) or a customer (e.g., CFNs). In embodiment, such functions are grouped into pipelined compute offloads using a plurality of configurable slots in FPGA 501. In an embodiment, providing the capability to chain compute offloads enables a customer to specify multiple offloads, each having varying M inputs and N output streams, and to be able to construct a data flow graph that connects them. This capability allows functions in some situations to be performed in parallel (thereby improving application performance), to be developed independently, and to be reused in various combinations.

Various components of compute server 101 and storage appliance 304 are communicatively coupled to each other by various types of communications media to coordinate operations. The coordination may involve the uni-directional or bi-directional exchange of information. For instance, the components communicate information in the form of signals communicated over the communications media. The information can be implemented as signals allocated to various signal lines. In such allocations, each message is a signal. Further embodiments, however, may alternatively employ data messages. Such data messages are sent across various connections. Example connections include parallel interfaces, serial interfaces, and bus interfaces.

It should be appreciated that the exemplary computing platforms shown in the Figures may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage appliance comprising:
   a bus;
   at least one mass storage device coupled to the bus;
   a library of functions, wherein each function is received from at least one of a cloud service provider operating a data center and a customer of the data center; and
   at least one compute engine coupled to the bus to communicate peer-to-peer with the at least one mass storage device, the at least one compute engine including a programmable logic component to execute at least one function to read data from the at least one mass storage device, process the data; and write data to the at least one mass storage device, wherein the programmable logic component comprises at least two configurable slots to store a compute offload bitstream including first and second functions, a first configurable slot to store the first function and a second configurable slot to store the second function, wherein the first function is to send output data to the second function.

2. The storage appliance of claim 1, wherein the programmable logic component comprises at least one FPGA, CPU, GPU, or ASIC.

3. The storage appliance of claim 1, wherein the library of functions comprises a plurality of compute offload bitstreams, each compute offload bitstream including a same number of functions as a number of configurable slots.

4. The storage appliance of claim 3, wherein the programmable logic component comprises a pipeline of a plurality of configurable slots, each configurable slot to store a function, the functions coupled in the pipeline such that a current function sends output data to a next function in the pipeline.

5. A system comprising:
   a network;
   at least one compute server coupled to the network, the at least one compute server to execute an application; and
   at least one storage appliance coupled to the network, storage appliance comprising:
   a bus;
   at least one mass storage device coupled to the bus;
   a library of functions, wherein each function is received from at least one of a cloud service provider operating a data center and a customer of the data center; and
   at least one compute engine coupled to the bus to communicate peer-to-peer with the at least one mass storage device, the at least one compute engine including a programmable logic component to execute at least one function to read data from the at least one mass storage device, process the data; and write data to the at least one mass storage device, wherein the programmable logic component comprises at least two configurable slots to store a compute offload bitstream including first and second functions, a first configurable slot to store the first function and a second configurable slot to store the second function, wherein the first function is to send output data to the second function.

6. The system of claim 5, wherein the programmable logic component comprises at least one FPGA, CPU, GPU, or ASIC.

7. The system of claim 5, wherein the library of functions comprises a plurality of compute offload bitstreams, each compute offload bitstream including a same number of functions as a number of configurable slots.

8. The system of claim 7, wherein the programmable logic component comprises a pipeline of a plurality of configurable slots, each configurable slot to store a function, the functions coupled in the pipeline such that a current function sends output data to a next function in the pipeline.

9. A data center system comprising:
   a network; and
   a plurality of server racks coupled to the network, wherein each server rack includes
   a plurality of compute servers to execute applications; and
   a plurality of storage appliances, wherein each storage appliance includes
   a bus;
   a plurality of mass storage devices coupled to the bus;
   a library of functions, wherein each function is received from at least one of a cloud service provider operating a data center and a customer of the data center; and
   a plurality of compute engines coupled to the bus to communicate peer-to-peer with the plurality of mass storage devices, each compute engine including a programmable logic component to execute at least one function to read data from the mass storage devices, process the data; and write data to the mass storage devices, wherein the programmable logic component comprises at least two configurable slots to store a compute offload bitstream including first and second functions, a first configurable slot to store the first function and a second configurable slot to store the second function, wherein the first function is to send output data to the second function.

10. The data center system of claim 9, wherein the programmable logic component comprises at least one FPGA, CPU, GPU, or ASIC.

11. The data center system of claim 9, wherein the library of functions comprises a plurality of compute offload bitstreams, each compute offload bitstream including a same number of functions as a number of configurable slots.

12. The data center system of claim 11, wherein the programmable logic component comprises a pipeline of a plurality of configurable slots, each configurable slot to store a function, the functions coupled in the pipeline such that a current function sends output data to a next function in the pipeline.

\* \* \* \* \*